Feb. 9, 1937.    N. STRAMAGLIA    2,070,379
AUTOMOTIVE REFRIGERATING AND COOLING SYSTEM
Filed Oct. 28, 1936
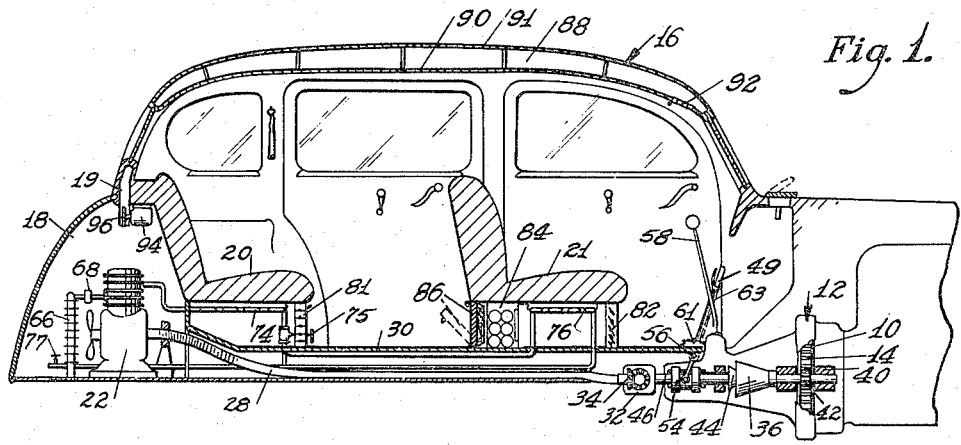
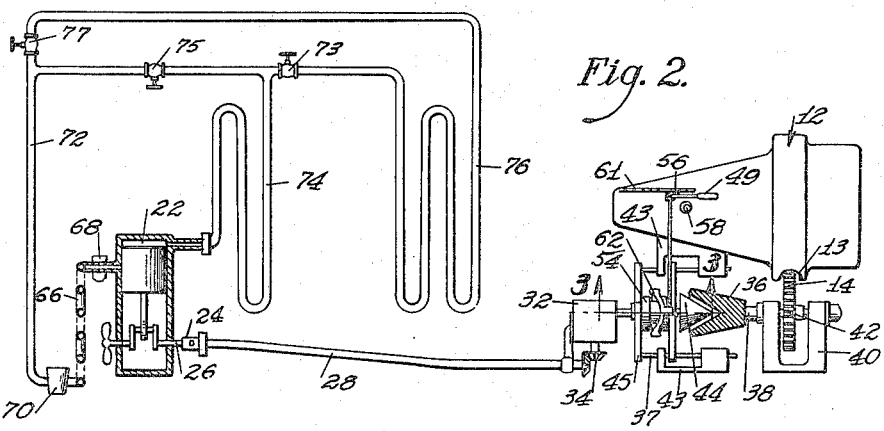
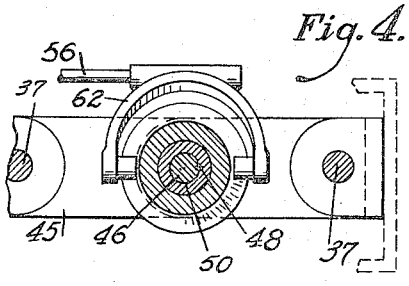
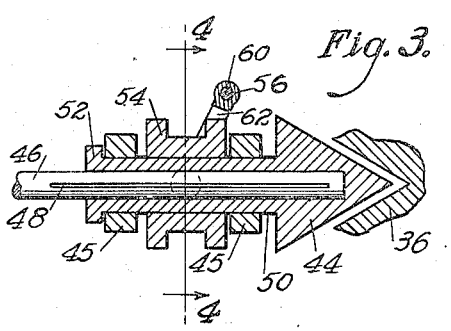
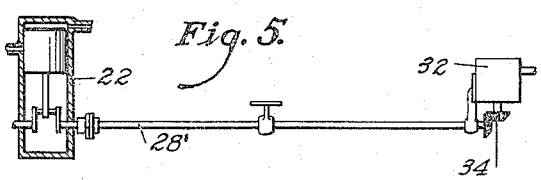
Nicola Stramaglia
INVENTOR.
BY Clarence E. Threedy
HIS ATTORNEY.

UNITED STATES PATENT OFFICE 2,070,379

AUTOMOTIVE REFRIGERATING AND COOLING SYSTEM

Nicola Stramaglia, Chicago, Ill.

Application October 28, 1936, Serial No. 107,941

2 Claims. (Cl. 62—117)

This invention is directed to improvements in air conditioning and cooling apparatus for automotive vehicles, and has among its important objects the provision of a refrigerating mechanism adapted to be driven from the flywheel of a car, means for selectively connecting and disconnecting the refrigerating mechanism from driving engagement with the flywheel, means for circulating conditioned air interiorly of the cab or body, and means providing a cooling compartment for foodstuffs or the like.

Additional objects of construction and function will appear as the following detailed description develops in view of the annexed drawing, in which:

Fig. 1 is a vertical section of an automobile body in which is incorporated the novel refrigerating mechanism;

Fig. 2 is a schematic showing of the functional elements of the mechanism;

Fig. 3 is an enlarged detail of the clutch mechanism;

Fig. 4 is a sectional detail along lines 4—4 of Fig. 3; and

Fig. 5 shows a modified form of connecting a link means, employing a rigid drive shaft.

The present invention is especially adapted for use with an automobile of the type having the usual main flywheel 10 (Fig. 1) rotatable within the transmission housing or unit 12, and having gear teeth 14 provided in its periphery. The mechanism is further adapted for use with the type of car having a closed body 16 with a compartment 18 provided at the rear and behind the rear seat structure 20.

In the embodiment chosen for purposes of illustration, and as shown particularly in Fig. 1, the refrigerating mechanism includes any suitable type of compressor 22 mounted within the rear compartment 18 behind the rear seat structure 20. The compressor is drivingly connected with the main flywheel 10 by means of a flexible drive shaft 24 connected at its rearward extremity with the crank shaft 26 of the compressor and extending through a flexible tube 28 below the flooring 30 of the body for connection with a speed reducing unit 32 by means of bevel gears 34.

It may also be desirable to use the rigid drive shaft 28' for connecting the compressor 22 to the speed reducer 34, as shown in the modified form of Fig. 5.

Driving connection is established between the speed reducer 32 and the engine flywheel 10 by means of a clutch system which may be of the cone type shown in detail in Figs. 2 and 3, and comprising a receiving cone 36 mounted on a stud shaft 38 supported in a bracket 40 which is adapted to be mounted on the car frame in any suitable manner. A spur gear 42 on the shaft 38 meshes in driving engagement with the peripheral gearing 14 on the flywheel 10 through a suitable opening 13 in the side of the casing 12, in such manner that the driving or receiving cone 36 is continually rotated when the engine is in operation.

A driven or engaging cone 44 is slidably mounted on a driven shaft 46 and is keyed to the latter by a longitudinal key 48. Rotatably joined with the driven cone 44 is a sleeve extension 50 having a collar portion 52 at its rear or left-hand extremity and having an idling ring 54 embracing its outer periphery between the cone and the collar 52.

The driven clutch 44 is supported by bracket means 43 attached to the frame of the car and to the transmission housing, and by a pair of cross-arms 45 each embracing the sleeve portion 50 of the driven cone structure and providing a bearing support for the same, the cross-arms 45 being slidably supported on the brackets 43 by means of longitudinally slidable arms 37. The driven shaft 46 terminates within the speed reducing unit 32 and serves to drive the flexible cable 24 through the bevel gears 34.

In order to effect driving connection of the compressor 22 with the engine motor, a manually operable lever 49 is pivotally mounted as at 56, adjacent the shift rod 58, so as to be easily accessible to the driver, and has connected with its lowermost extremity as at 60 (Fig. 3), a yoke 62 having its arm portions extended into operative engagement with the idling collar 54 such that when the control lever 49 is pivoted in an anti-clockwise direction, the driven cone 44 will be thrown into engagement with the driving cone 36 through the yoke 62 and the idling ring 54, and for the purpose of maintaining the clutch members in driving relation a usual form of ratchet plate 61 is provided and mounted in fixed relation to the lever 49 for engagement with a manually operable latch rod 63 on the lever 49.

In addition to the compressor 22, the refrigerating mechanism includes a combination condenser and reservoir 66 supported adjacent the compressor and having connection therewith through a check valved line 68, and connected through an expansion valve 70 to an expansion line 72 having two branch sets of expansion coils 74 and 76 respectively located in compartments under the rear seat 20 and the front seat 21, and having connection through valves 73, 75, 77 with the main expansion line 72 in such manner that both of the coils 74 and 76 may be operatively connected with the expansion line 72 to absorb heat from their respective compartments, or the front coil 76 may be cut off from the rear coil 74 by closing valves 73 and 77.

The respective compartments of the expansion coil units 74 and 76 communicate with the interior of the body 16 through manually adjustable louvers 81 and 82, so that in addition to the valved control provided for the expansion system the circulation of air relative to the compartments under rear and front seats 20 and 21 may be controlled by opening and closing of the louvers.

Beneath the front seat 21 and communicating with the compartment in which the expansion coil 76 is situated, is a storage compartment 84 accessible through a door 86 to the rearward compartment of the car, this storage compartment being suitable for the accommodation of foodstuffs or the like.

Means for circulating the refrigerated or conditioned air within the body 16 includes a duct or channel 88 formed between the dome 90 and the roof 91 of the car, and communicating from the register 92 situated in the forward region of the dome 90 to the rear compartment 18 through a terminal duct portion 19 at the lower end of which is an air impelling means including a small motor 94 adapted to be driven from the storage battery or generating system of the car, and having a small propeller 96 positioned adjacent the lower or exit extremity of the terminal duct 19 in such manner as to cause a circulation of the warmer air in the upper region of the interior of the body through the register 92, the channel 88 into the compartment 18 from where it may be expelled through openings provided in the floor of the compartment, and which air additionally serves to cool the condenser coils 66 before leaving the compartment 18.

Replacement air seeps into the interior of the car body which is otherwise normally closed off, through the ventilating cowls or through the crevices naturally existing about the doors and windows, the interior air being to a large extent refrigerated before passing out the register 92 and the cold air lying in the region adjacent the car floor having ample opportunity to mix with the interior air before rising upwardly toward the exhaust outlets.

In the operation of the device, it may be assumed that the automobile motor is in operation and the flywheel 10 revolving in the usual manner. By releasing the ratchet latch 63 on the lever 49 and moving the latter in an anti-clockwise direction, the yoke 62 (Figs. 2 and 3) will be moved forwardly (toward the right) and the arms thereof extended into the ring portion of the idling ring 54 will urge the bracket arms 45 forward in their slidable engagement by the longitudinal rods 37, which are slidably supported in the brackets 43, so as to cause the sleeve 50 and the driven cone 44 to move into driving relationship with the driving cone 36, the latter being continually driven through the gear 42 which is constantly meshed with the peripheral gearing 14 on the flywheel 10. Thus the rotation of the driven shaft 46 will be effected and the motion of this member will be transmitted through the speed reducing unit 32 and the bevel gears 34 to the drive cable 24 which is drivingly connected to the crank shaft 26 of the compressor 22, or the rigid drive shaft 28' may be used instead.

Assuming that valves 73 and 77 (Fig. 2) are open and valve 76 is closed, the refrigerant, which for example may be sulphur dioxide, normally contained within the condenser and reservoir 66 will expand through the valve 70 into the expansion line 72, past valve 77, through the forward expansion coil 76 under the front seat 21, and also through the valve 73 and the rear expansion coil 74, where the gas will be drawn into the compressor 22, compressed therein and returned through the check valve 68 to the condenser 66, thus cooling the air in the compartment below the front and rear seats and the air so cooled migrating into the air within the closed off car body, where its temperature will be raised and the warmer and lighter air will be drawn through the register 92, channel 86 between the car dome and roof, and into the rear compartment 18 by means of the small battery driven blower unit 94, 96.

It will be apparent that I have provided novel improvements in air conditioning means for automobiles and the like, and in means for effecting driving connection with the propelling, or motor means of the vehicle, together with novel means for distributing the air within the vehicle, and while I have described a preferred embodiment of the invention with particularity as to structural details, I do not desire to be limited to any specific recitations herein except as may be otherwise provided by the annexed claims.

Having thus described my invention, what I claim as new and desire to protect by Letters Patent is:

1. An air cooling system for automotive vehicles of the type having a substantially closed cab and a motor-driven flywheel having a geared periphery, said cooling mechanism comprising a refrigerating apparatus including a refrigerant compressor and a refrigerant expansion line therefor, driving means for said compressor including a link drive member operatively attached to the compressor, a driven gear drivingly engaged with the geared portion of said flywheel, a first clutch member rotatable with said driven gear, a second clutch member slidable into and out of driving engagement with said first clutch member, manually operable means for moving said second clutch member into and out of engagement with the first member, and means including a speed reducing device drivingly connecting said second clutch member and said link drive member whereby said compressor may be operated from said flywheel, refrigerant expansion means within said cab and connected with said expansion line, together with air circulating means including a channel formed between wall portions of said cab and communicating at one extremity with the interior of the same and at its other extremity with an exhaust port opening exteriorly of the cab, and means including a motor-driven blower for withdrawing air from within said cab through said channel.

2. An air cooling system for automotive vehicles of the type having a substantially closed cab with front and rear seat structures therein, a rear compartment behind said rear seat structure, electrical power means, a motor-driven flywheel having a geared periphery, said cooling mechanism comprising: refrigerating means including a refrigerant compressor in said rear compartment; refrigerant expansion means beneath said front and rear seat structures and operatively connected with said compressor; means for effecting driving connection between said compressor and said flywheel and including a flexible connecting member drivingly connected to the compressor, a first clutch member drivingly connected with the geared periphery of said flywheel, a second clutch member slidable into and out of driving engagement with said first clutch member, manually operable lever means in said cab for moving said second clutch member into and out of driving engagement as aforesaid, means including a speed reducing device operatively connecting said second clutch member and said flexible connecting member; manually adjustable louver means communicating from compartments under said seat structures to the interior of said cab, together with air transfer means, including duct means formed on an interior wall of said cab and communicating from the upper region thereof into said rear compartment, and an electrically-driven air impeller operable to withdraw air from within said cab and transfer such air into said rear compartment, said electrically-driven air impeller being energized from said electrical power means.

NICOLA STRAMAGLIA.